United States Patent [19]

Rossi

[11] Patent Number: 5,162,059
[45] Date of Patent: Nov. 10, 1992

[54] DISCONTINUOUS FIBER MADE OF DRAWN STEEL WIRE, AND A FIBER COMPOSITE CONTAINING SAID FIBER

[75] Inventor: Pierre Rossi, Paris, France

[73] Assignee: Etat Francais Represente Par le Laboratoire Central des Ponts et Chausees, France

[21] Appl. No.: 850,241

[22] Filed: Mar. 11, 1992

Related U.S. Application Data

[63] Continuation of Ser. No. 618,160, Nov. 26, 1990.

[30] Foreign Application Priority Data

Nov. 30, 1989 [FR] France .................. 89 15839

[51] Int. Cl.$^5$ ............................................ C04B 30/02
[52] U.S. Cl. ...................... 106/644; 106/643; 106/688; 52/659
[58] Field of Search ............. 106/644, 643; 52/659; 24/Dig. 10, 677

[56] References Cited

U.S. PATENT DOCUMENTS 1,913,707  6/1933  Ethridge .
3,616,589  11/1971  Sherard .................. 52/659
4,780,141  10/1988  Double et al. .................. 106/644

FOREIGN PATENT DOCUMENTS 11754 of 1915 United Kingdom .

OTHER PUBLICATIONS

Chemical Abstracts, vol. 107, Jul. 1987 p. 265, Ref No. 27539X, JPA-6287448 (Eito Tatsumi) Apr. 21, 1987.

Primary Examiner—William R. Dixon, Jr.
Assistant Examiner—C. Melissa Bonner
Attorney, Agent, or Firm—Marshall & Melhorn

[57] ABSTRACT

A discontinuous drawn steel wire fiber for incorporation in a fiber composite, in particular a cement material, the fiber being made from a length of steel wire which is shaped so that the fiber is contained in a plane and, in said plane, is in the configuration of a loop which is convex and closed, wherein it has the configuration of an oblong loop whose ends are delimited by curvilinear wire portions, said curvilinear wire portions being interconnected by rectilinear wire portions, and wherein the two end portions of said length of wire are disposed side by side and in opposite directions, said end portions extending between said curvilinear wire portions to form one of said rectilinear wire portions.

6 Claims, 1 Drawing Sheet

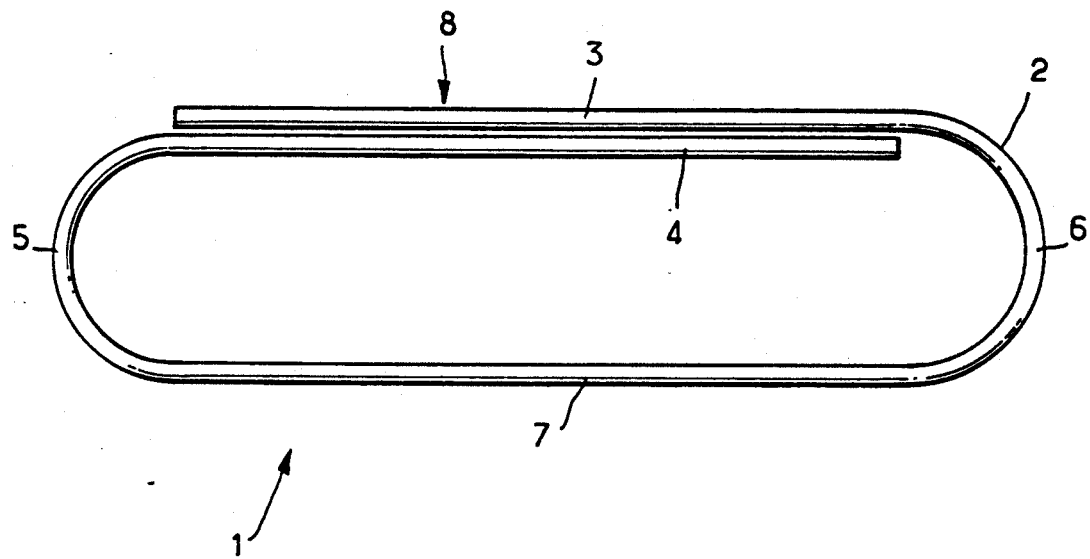

DISCONTINUOUS FIBER MADE OF DRAWN STEEL WIRE, AND A FIBER COMPOSITE CONTAINING SAID FIBER

This application is a continuation of application Ser. No. 07/618,160, filed Nov. 26, 1990.

The present invention relates to fiber composites.

It relates more particularly to a new discontinuous metal fiber geometry for incorporation in a fiber composite, in particular in a cement matrix.

BACKGROUND OF THE INVENTION

Concrete or mortar is strong in compression but weak in traction. This weakness can give rise to cracks appearing in the concrete.

The process whereby concrete cracks comprises three stages, and these stages are always the same regardless of the mechanical load. Initially microcracking is observed which is diffuse and spread throughout the volume of the material. Thereafter, a certain number of the microcracks are seen to coalescence, thereby forming one or more macrocracks. Finally, during the last stage, one or more of the macrocracks created during the preceding stage propagate until the material ruptures completely.

In order to improve the strength of these materials in traction, proposals have been made to incorporate discontinuous fibers therein. Unlike the conventional reinforcement of reinforced concrete, these discontinuous fibers are distributed throughout the volume of the material.

The discontinuous fibers have an effect in all three stages of concrete cracking. During the first stage of cracking, the fibers act as stitches and slow down the growth of microcracks, thereby delaying the creation of macrocracks. Nevertheless, macrocracks do appear eventually, and the fibers then act on them as bridges conveying forces across the lips of the macrocracks, thereby ensuring that the cracked structure remains stable.

For the fiber to be effective at the scale of microcracks or at the scale of macrocracks, it is necessary for the fiber to be well anchored in the cement matrix.

In order to ensure that the fiber is well anchored, it must adhere well to the matrix. Adherence is a property of the fiber-matrix bond representative of the local resistance of the fiber to slipping. Obtaining good fiber adherence depends on the material from which the fiber is made, on its greater or lesser specific area, on its smoother or rougher surface appearance, or on the presence of crenellations, undulations, etc.

When adherence between the fiber and the matrix is not very good, it is nevertheless still possible to obtain adequate anchoring of the fiber. Under such circumstances, it suffices merely to ensure that fiber length is very long compared with the maximum crack gaps that the fiber is to bridge, or it is also possible to provide anchoring heads at the ends of the fiber, e.g. in the form of hooks.

Numerous designs of discontinuous metal fibers for improving the mechanical properties of a cement matrix are commercially available, however two main technological problems generally arise when discontinuous metal fibers are incorporated in a cement matrix.

The first problem is that the greater the quantity of fibers incorporated in the concrete, the more difficult the concrete becomes to handle, and this gives rise to problems in putting the fiber-containing concrete properly into place within shuttering. The solution for solving this problem consists in altering the granular skeleton of the concrete, i.e. the sand/aggregate ratio. The fiber-containing composite is then easier to handle, but its mechanical strength is reduced.

The second technological problem is that for most drawn steel wire fibers which are longer than the longest pieces of aggregate in the cement matrix, a fiber-tangling phenomenon occurs in the matrix, particularly when the percentage of incorporated fibers is high. The fibers tend to clump together. This phenomenon leads to a fiber composite being obtained in which there are spaces that include no fibers, thereby providing a material which is highly non-uniform. This feature is very detrimental to the mechanical strength of the composite.

Steel wire fibers are very ductile in traction, thereby enabling them to stretch considerably while continuing to withstand the force which is applied to them. For concrete, steel wire fibers should therefore be capable of stitching together the edges of macrocracks even when the gap width is large, while still imparting a degree of stability to the cracked structure.

Discontinuous straight fibers are known, but they suffer from poor anchoring in the matrix, and they tend to clump together in ordinary concrete whenever they are greater than or equal to 15 mm in length and for incorporated volume percentages that are greater than or equal to 1%.

Undulating fibers or fibers having special anchoring heads at their ends, e.g. headed fibers that are bone-shaped or in the form of a nail with two heads, provide good anchoring but they still suffer from a tendency to clump together when a high percentage of them is incorporated in the matrix. This problem can only be solved by special technological procedures for incorporating the fibers in the matrix, however these procedures increase the cost price very considerably.

Fibers are also known which are provided with hooks and which are presented in the form of plates of stuck-together fibers, thereby considering facilitating incorporation of the fibers in the concrete and mixing thereof. In addition, the hooks significantly improve fiber anchoring. The tips of these fibers diverge in order to prevent them catching one another and clumping together, thereby giving a fiber composite whose surface state includes visible tips.

Discontinuous fibers are also known which are in the form of closed convex loops. U.S. Pat. No. 1,913,707 discloses a fiber in the form of an annular segment whose two ends face one another. With this circular fiber, any increase in friction dissipation obtained by selecting a small radius of curvature occurs to the detriment of anchoring length. Finally, while the cement matrix is being mixed, the segments may open, thereby causing the fibers to clump together.

U.S. Pat. No. 3,616,589 discloses a fiber having a shape which is convex, but closed. The ring may be closed by welding together the two ends of an annular segment. This structure prevents the fibers clumping together, but it does not make it possible to obtain high energy dissipation simultaneously by friction (same problem as with U.S. Pat. No. 1,913,707) and by plastification, with plastification being concentrated to segment portions close to the crack.

U.S. Pat. No. 3,616,589 constitutes the prior art closest to the present invention.

SUMMARY OF THE INVENTION

The present invention provides a discontinuous drawn steel wire fiber for incorporation in a fiber composite, in particular a cement material, the fiber being made from a length of steel wire which is shaped so that the fiber is contained in a plane and, in said plane, is in the configuration of a loop which is convex and closed, wherein the fiber has the configuration of an oblong loop whose ends are delimited by curvilinear wire portions, said curvilinear wire portions being interconnected by rectilinear wire portions, and wherein the two end portions of said length of wire are disposed side by side and in opposite directions, said end portions extending between said curvilinear wire portions to form one of said rectilinear wire portions.

This fiber configuration makes it possible to dissipate a large amount of energy by friction and by plastification. The radius of curvature of the curvilinear wire portions is small, thereby enabling a maximum amount of energy to be dissipated by friction. In addition, the rectilinear wire portions provide a long anchoring length for the fiber, and consequently a large amount of energy dissipation by plastification in the event of transverse cracking. In addition, since the two end portions of the length of wire are disposed side by side instead of being welded together, energy dissipation by plastification is further improved while preventing the fibers catching onto one another while the cement matrix is being mixed.

Advantageously, the length of the rectilinear wire portions lies in the range 10 millimeters to 50 millimeters.

Advantageously, two rectilinear wire portions are spaced apart by a distance greater than two-fifths of the length of the rectilinear wire portions, and less than twice said length.

Advantageously, the wire is cylindrical, and its diameter lies in the range 0.1 mm to 1 mm.

The geometry of the proposed fiber is close to that of an office paper clip with the clipping loop thereof omitted.

The closed structure of the proposed discontinuous fiber provides local confinement of the cement matrix, thereby providing improved control of the microcracking that may appear in the matrix.

The proposed fiber shape may be thought of as being a fiber provided with very large hooks with the adjacent tip portions thereof overlapping over a long length, thereby providing excellent anchoring for the fiber in the matrix.

These fibers are easy to use and require no special additional technology to prevent the fibers clumping together while making a fiber composite. This is explained by the fact that the largest lumps of aggregate in the concrete are similar in size and shape to the proposed fibers, and therefore have a partitioning effect tending to separate the fibers individually within the matrix during mixing. In addition, there is no longer any danger of injury from the tips of the fibers during handling.

The present invention also relates to a fiber composite containing fibers as described above.

BRIEF DESCRIPTION OF THE DRAWINGS

An embodiment of the invention is described below with reference to the sole figure of the accompanying drawing which shows a discontinuous fiber made of drawn steel wire and in accordance with the present invention.

DETAILED DESCRIPTION

As can clearly be seen in the drawing, the discontinuous fiber 1 made of drawn steel wire is made from a length of cylindrical steel wire which is shaped so that the fiber 1 is contained in a plane, having the configuration in said plane of a loop which is convex and closed, with the two end portions 3 and 4 with the length 2 of steel wire being disposed side by side and extending in opposite directions. The fiber is preferably in the form of an oblong loop with two curvilinear wire portions 5 and 6 occupying semicircles and interconnected by rectilinear wire portions 7 and 8. The two end portions 3 and 4 of the length of wire 2 constitute the rectilinear portion 8 and extend between the curvilinear portions 5 and 6.

The length of the rectilinear portions 7 and 8 lies between 10 mm and 50 mm, and these rectilinear portions which are substantially parallel are spaced apart by a distance lying between two-fifths of their length and twice their length. The length of wire 2 is preferably cylindrical and its diameter lies between one tenth of a millimeter and one millimeter.

The dimensions of fibers 1 as used in a fiber composite, in particular a cement matrix, is a function of the size of the lumps of aggregate incorporated in the cement matrix. The volume percentage of the fibers in the cement matrix is close to 1%.

The closed shape of the fibers 1 prevents them from catching one another, and the surfaces of the lumps of aggregate entrain the fibers during mixing of the cement matrix, thereby enabling a uniform fiber composite to be obtained in which the fibers are separate from one another. This closed shape also ensures that the fibers are well anchored, and gives rise to a composite having a surface state which is free from tips or points.

I claim:

1. A discontinuous drawn steel wire fiber for incorporation in a fiber composite, in particular a cement material, the fiber being made from a length of steel wire which is shaped so that the fiber is contained in a plane and, in said plane, is in the configuration of a loop which is convex and closed, wherein the fiber has the configuration of an oblong loop whose ends are delimited by curvilinear wire portions, said curvilinear wire portions being interconnected by rectilinear wire portions, and wherein the two end portions of said length of wire are free and unjoined disposed side by side and in opposite directions, said end portions extending between said curvilinear wire portions to form one of said rectilinear wire portions whereby the steel wire loop is adapted to change shape in response to changing conditions and dissipate energy.

2. A fiber according to claim 1, wherein the length of the rectilinear wire portions lies in the range 10 millimeters to 50 millimeters.

3. A fiber according to claim 1, wherein two rectilinear wire portions are spaced apart by a distance greater than two-fifths of the length of the rectilinear wire portions, and less than twice said length.

4. A fiber according to claim 1, wherein the wire is cylindrical, and wherein its diameter lies in the range 0.1 mm to 1 mm.

5. A fiber composite, in particular having a cement matrix, comprising discontinuous fibers of drawn steel wire embedded in a mass of cement, the composite including fibers according to claim 1.

6. A fiber composite according to claim 5, wherein the percentage by volume of the fibers is up to about 1%.

* * * * *